United States Patent [19]

Englert

[11] Patent Number: 5,307,762
[45] Date of Patent: May 3, 1994

[54] HOOD FOR REPTILE TANK
[75] Inventor: Francis B. Englert, Clifton Park, N.Y.
[73] Assignee: Village Wholesale, Inc., Latham, N.Y.
[21] Appl. No.: 42,569
[22] Filed: Apr. 5, 1993
[51] Int. Cl.5 ............................................. A01K 63/06
[52] U.S. Cl. .................................................. 119/266
[58] Field of Search ........................................... 119/5
[56] References Cited

U.S. PATENT DOCUMENTS

| | | | |
|---|---|---|---|
| 3,088,436 | 5/1963 | Lyon | 119/37 |
| 3,125,065 | 3/1964 | Willinger | 119/5 |
| 3,584,605 | 6/1971 | Schwartz | 119/37 |
| 3,834,351 | 9/1974 | Schmidt | 119/5 |
| 3,983,843 | 10/1976 | Johnson | 119/5 |
| 4,122,800 | 10/1978 | Mangarell | 119/5 |
| 4,188,909 | 2/1980 | Spivak | 119/5 |
| 4,754,571 | 7/1988 | Riechmann | 119/5 X |
| 4,773,008 | 9/1988 | Schroeder et al. | 119/5 X |
| 4,787,336 | 11/1988 | Lineberry | 119/5 |
| 4,850,900 | 7/1989 | Yarmark | 439/648 |
| 5,010,845 | 4/1991 | Azpurua et al. | 119/17 |
| 5,040,488 | 8/1991 | Hwang | 119/5 |
| 5,089,940 | 2/1992 | Lanzarone et al. | 119/5 X |

*Primary Examiner*—Robert P. Swiatek
*Attorney, Agent, or Firm*—Harris Beach & Wilcox

[57] ABSTRACT

A hood for a tank to be used in housing reptiles, comprising a body sized to rest on top of the tank, sockets for a fluorescent light source disposed on the bottom surface of the body, sockets for incandescent light sources disposed on the bottom surface of the body, a switch for controlling the fluorescent light source, and a separately operable switch for controlling the incandescent light sources.

6 Claims, 3 Drawing Sheets

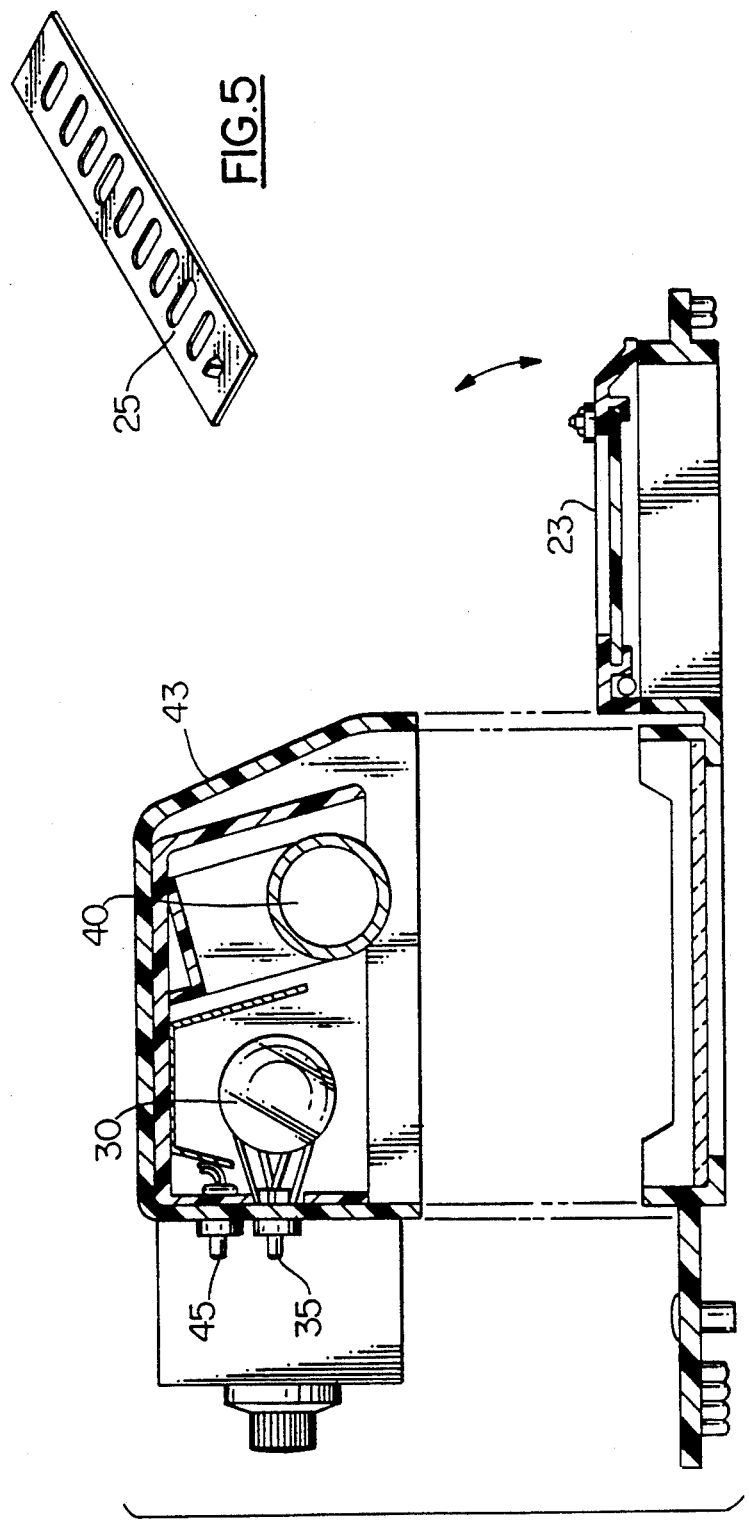

HOOD FOR REPTILE TANK

BACKGROUND OF THE INVENTION

This invention relates to a hood to be used in conjunction with a reptile tank, and more particularly pertains to a reptile tank hood which provides independently operable incandescent and fluorescent light to the reptile tank.

Because reptiles are cold-blooded they are extremely sensitive to temperature variations and need to be maintained in a carefully controlled environment.

Reptiles have very particular needs for both heat and light. Both tropical and temperate species of reptiles require heat in order to digest their meals. This heat must be in a relatively narrow range of about 80 degrees. Temperatures of above 90 degrees or as low as 70 degrees Fahrenheit are not acceptable.

Incandescent lights provide heat to the reptiles in a tank. However incandescent lights are not a good substitute for sunlight. Fluorescent lights provide the best substitute for sunlight, according to "Heat is neat for healthy herptiles", Deann Munson, PSM, Sept. 1991, pp. 16, 20, 22. However fluorescent lights do not provide sufficient heat. Furthermore fluorescent lights need to be turned off at night in order to provide reptiles with the requisite nocturnal time period of between 10 and 14 hours. During this nocturnal period, the tank environment will cool quickly without an external source of heat.

Different habitats have been used in order to house reptiles, providing for their particular needs. U.S. Pat. No. 5,010,845 to Azpûrua et al. shows a reptile cage having a resistance heater, infra-red light source, humidifier and heat refractor web. This does not provide the sunlight type of illumination needed by reptiles.

U.S. Pat. No. 4,122,800 to Mangarell shows a self-contained vivarium habitat for reptiles and amphibians which contains both white fluorescent and dark-infra-red lamps, the former providing light and the latter heat. The infra-red lamp is thermostatically maintained. This habitat contains aquatic, barrier and dry land areas especially suitable for amphibian inhabitants. This is a complete and complex habitat which provides a proper environment for either amphibians or small reptiles.

SUMMARY OF THE INVENTION

The instant invention pertains to a hood to be used in conjunction with a reptile tank. This reptile tank hood can be placed atop a corresponding standard size of aquarium tank, and provides independently operable incandescent and fluorescent lighting to the reptile tank, thus furnishing both heat and simulated daylight. This is accomplished without the need for a specialized and expensive tank. Use of low wattage incandescent white or red bulbs provides heat. Use of fluorescent lighting allows the simulation of the day-night cycle; by turning off the fluorescent light for the 10 to 14 hours of night period needed for reptilian well-being.

The tank hood may also be provided with an access door for allowing access to the tank interior, without having to remove the hood. A latch is provided on the door to prevent the escape of the tank inhabitants. In addition, portions of the hood may be provided with mesh, screening, or other means of ventilation. This allows free circulation of heat and air through the lighted area to prevent overheating; it also provides ventilation and air circulation to the habitation area.

It is therefore a primary object of the present invention to provide a hood for a reptile tank which provides the benefits of both incandescent and fluorescent lighting.

It is a further object of the present invention to provide a hood for a reptile tank which provides the benefits of both incandescent and fluorescent lighting, with each lighting source being independently operable.

It is another object of the present invention to provide a hood for a reptile tank which provides the benefits of both incandescent and fluorescent lighting, and which allows easy access to the tank interior while guarding against the escape of the tank inhabitants.

It is a further object of the present invention to provide a hood for a reptile tank which provides the benefits of both incandescent and fluorescent lighting, and which provides for ventilation and for circulation of heat from the lighting elements.

These and other objects of the present invention are attained by a hood for a tank to be used in housing reptiles, comprising: a body sized to rest on top of the tank, having a plurality of sockets for fluorescent light sources, a plurality of sockets for incandescent light sources, means for controlling the fluorescent light sources; and means for controlling the incandescent light sources independent of the fluorescent light sources.

BRIEF DESCRIPTION OF THE DRAWINGS

For a better understanding of these and other objects of the present invention, reference is made to the detailed description of the invention which is to be read in conjunction with the following drawings, wherein:

FIG. 4 is an enlarged cross sectional side view of the hood of FIG. 2 taken along the line 4—4.

FIG. 5 is a view of the ventilation grill of the hood of FIG. 2.

DETAILED DESCRIPTION OF THE INVENTION

Figure 1:
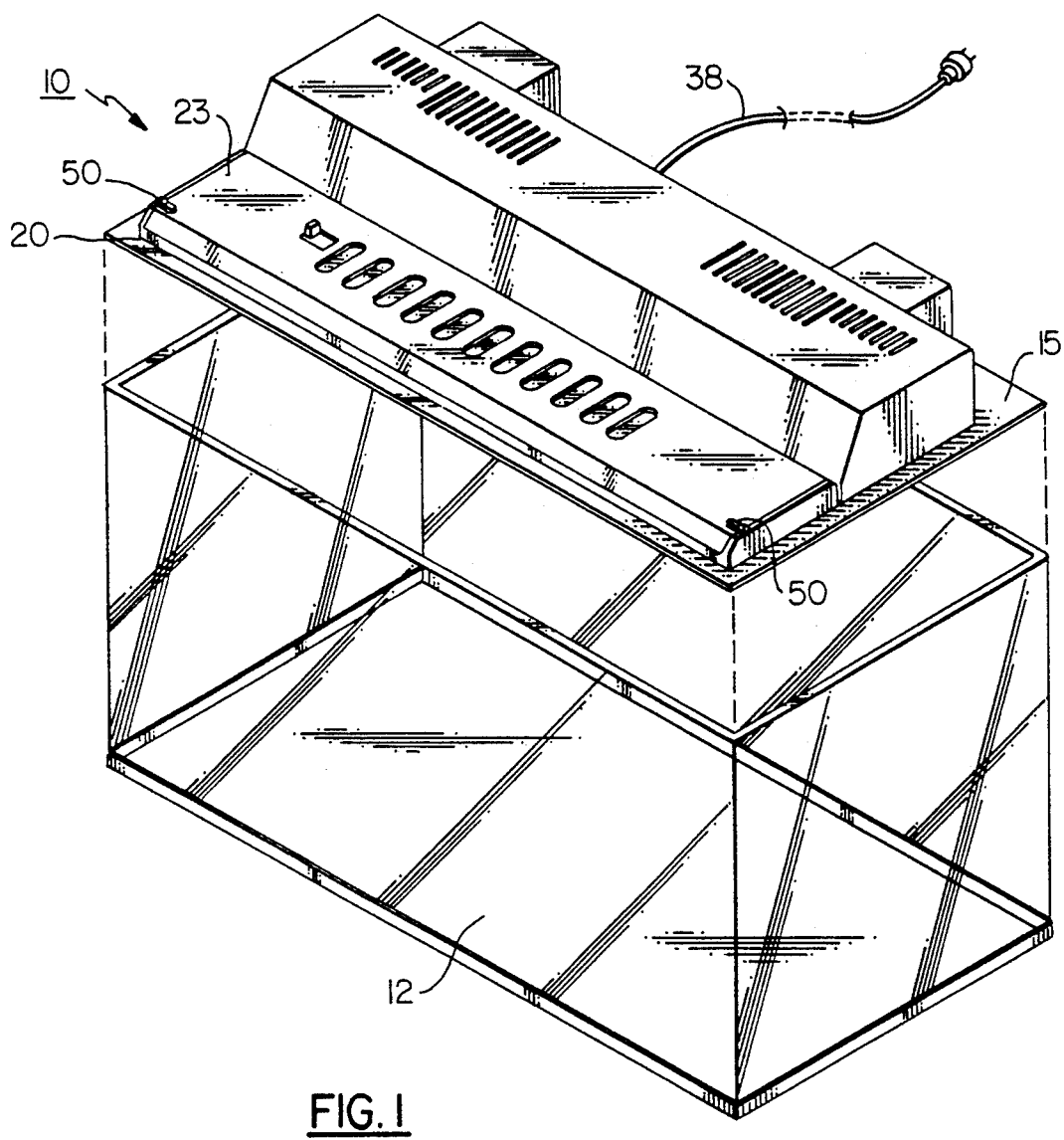
FIG. 1 is a perspective view of the hood of the present invention preparatory to its being set on a standard aquarium.

Referring now to FIG. 1, a preferred embodiment of the reptile tank hood 10, is sized so that it can comfortably rest upon a standard size of aquarium tank 12. The hood 10 comprises two sections, a front section 20 and a back section 15. In the front section 20, there is a door 23 which can be flipped open in an upward direction in order to provide access to the tank interior for providing food, water, and performing common maintenance tasks. The back section 15, has a separable light housing 43 which accommodates at least two different illumination sources, as will be hereinafter discussed. Power is provided to the illumination sources via a standard cord and plug 38 which may be used in conventional electrical sockets (not shown). The light housing 43 rests on a transparent inset 53 in the back section 15 and can be lifted off in order to change light bulbs without having to remove the tank hood 10 and risk the escape of the inhabitants of the tank. The transparent inset 53 is comprised of clear glass, plastic or the like.

Figure 2:
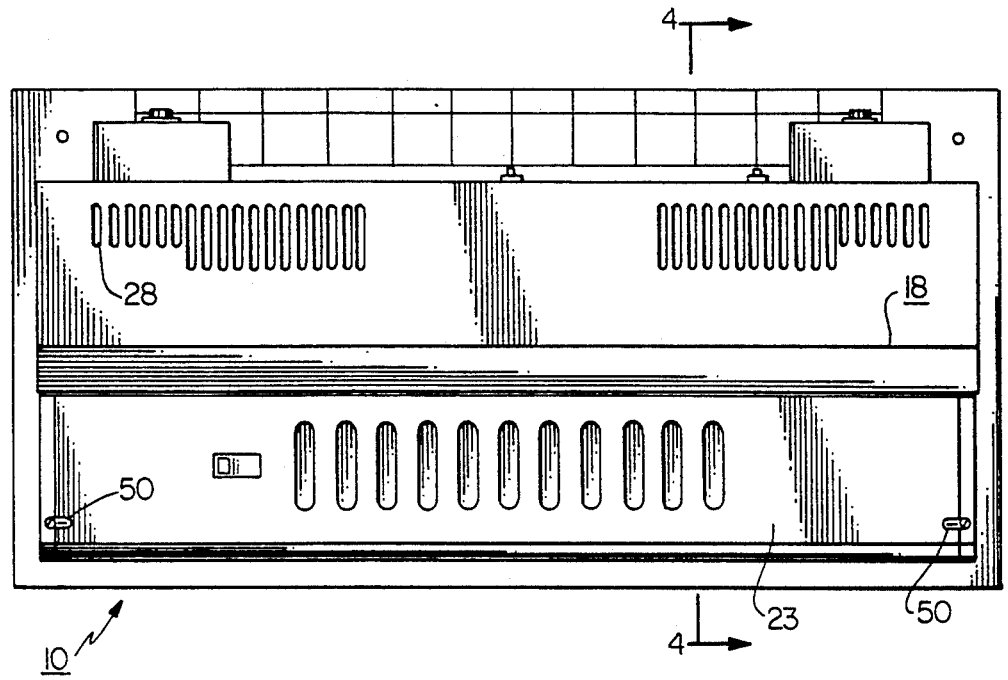
FIG. 2 is a top view of the hood of the instant invention.

Looking down on the top of the hood 18 in FIG. 2, it can been seen that the illumination source containing back portion 15 has therein a series of openings 28, to allow circulation of heat and ventilation about the light bulbs so as to prevent overheating and possible breakage therefrom. Holes 25 are also present in the door 23 of the front section 20 to allow circulation of air into the habitation portion of the tank to ensure the comfort and well-being of the inhabitants therein, as can be seen more clearly in FIG. 5.

Figure 3:
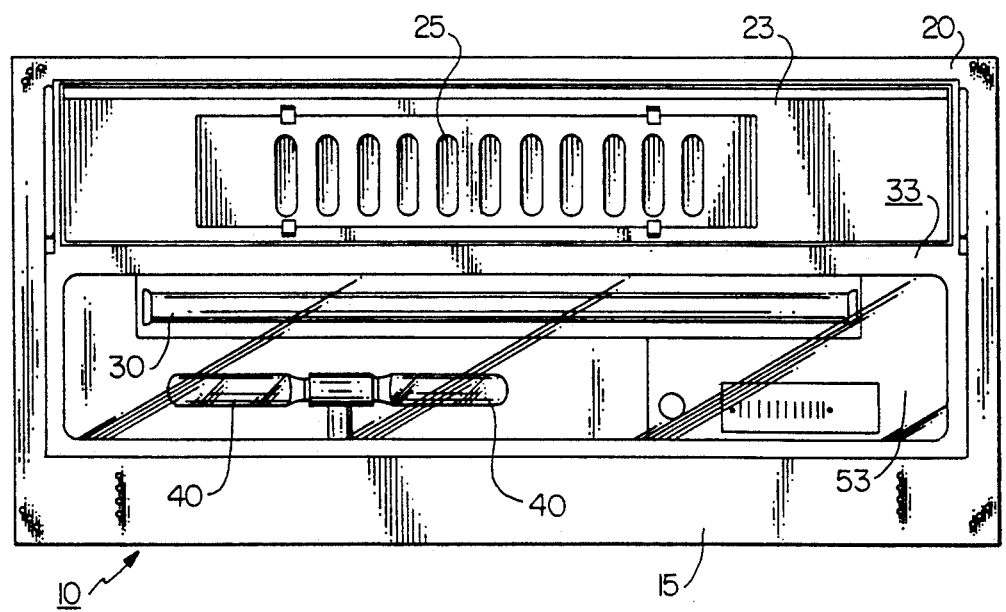
FIG. 3 is a bottom view of the hood of FIG. 2.

Looking up at the bottom of the hood 33 in FIG. 3, it can be seen that sockets are provided for three lamps, a single fluorescent lamp 30, and a pair of low wattage incandescent lamps 40—40. The former provides light, more specifically light that emulates daylight and allows the reptile inhabitants of the tank to experience a normal period of diurnal activity. The latter provide a minimal amount of light, so that the nocturnal rest period of the reptiles is not disturbed; they also provide heat so that the reptiles can maintain health, digest food, reproduce, and otherwise flourish. The two types of light, fluorescent 30 and incandescent 40 are separately controllable with a switch 35 for fluorescent light 30 and a separate switch 45 for incandescent lights 40—40 as can be seen in FIG. 4. In the alternative, a third switch can be additionally provided for separate control of each of the incandescent lights. Red colored incandescent lights may also be used in the incandescent sockets in order to provide a greater heat/light ratio.

The door 23 is capable of being latched closed by a pair of pivotable barriers 50.50 or by other means well known in the art in order to prevent the escape of the reptile(s) from the aquarium tank.

While this invention has been explained with reference to the structure disclosed herein, it is not confined to the details set forth and this application is intended to cover any modifications and changes as may come within the scope of the following claims.

What is claimed is:

1. A hood for closing an open top reptile tank that includes,
   a top wall capable of resting upon side walls of an open top reptile tank for closing the tank,
   said top wall having a door means that moves between an open position whereby access is provided to said tank and a closed position whereby reptiles contained within said tank are prevented from escaping,
   a transparent panel in said top wall for permitting light to enter said tank,
   a light housing removably connected to said top wall over said transparent panel,
   a fluorescent light means mounted in said housing for providing simulated day light to said tank,
   a low wattage incandescent light means mounted in the housing for providing heat to said tank, and
   control means for turning the fluorescent light means on and off and thus providing a simulated lighted day period and an unlighted nocturnal rest period.

2. The hood of claim 1 wherein said door means includes openings passing therethrough for permitting controlled ventilation of said tank.

3. The hood of claim 2 that further includes latching means for holding said door in a closed position.

4. The hood of claim 1 wherein said light housing further includes electrical means for providing power to said light means.

5. The hood of claim 1 wherein said light housing contains ventilation means for allowing ambient air to enter said housing to cool both said light means whereby predominately radiant energy passes into said tank.

6. The hood of claim 1 wherein the low wattage incandescent light means provides a minimal amount of light that will not disturb the nocturnal rest periods when the fluorescent light means is turned off.

* * * * *